(12) United States Patent
Kaneda (10) Patent No.: US 9,762,379 B2
(45) Date of Patent: Sep. 12, 2017

(54) CLOCK RECOVERY FOR AN OPTICAL RECEIVER

(71) Applicant: Alcatel-Lucent USA Inc., Murray Hill, NJ (US)

(72) Inventor: Noriaki Kaneda, Westfield, NJ (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 0 days.

(21) Appl. No.: 15/018,019

(22) Filed: Feb. 8, 2016

(65) Prior Publication Data

US 2017/0230167 A1    Aug. 10, 2017

(51) Int. Cl.
| | |
|---|---|
| H04L 7/00 | (2006.01) |
| H04B 10/61 | (2013.01) |
| H04L 7/033 | (2006.01) |
| H04J 14/06 | (2006.01) |
| H04J 14/02 | (2006.01) |
| H04J 14/04 | (2006.01) |

(52) U.S. Cl.
CPC ....... *H04L 7/0075* (2013.01); *H04B 10/6165* (2013.01); *H04J 14/02* (2013.01); *H04J 14/04* (2013.01); *H04J 14/06* (2013.01); *H04L 7/0331* (2013.01)

(58) Field of Classification Search
USPC ................ 398/202, 155, 208, 183
See application file for complete search history.

(56) References Cited

U.S. PATENT DOCUMENTS

| | | | | |
|---|---|---|---|---|
| 6,731,697 B1* | 5/2004 | Boccuzzi | .............. | H04L 7/0334 |
| | | | | 375/326 |
| 8,655,191 B2 | 2/2014 | Kaneda et al. | | |
| 2002/0012152 A1* | 1/2002 | Agazzi | ................ | H03M 1/0624 |
| | | | | 398/202 |
| 2006/0013597 A1* | 1/2006 | Crivelli | .............. | H04B 10/6971 |
| | | | | 398/208 |
| 2006/0285854 A1* | 12/2006 | Sun | ........................ | H03L 7/085 |
| | | | | 398/155 |

(Continued)

OTHER PUBLICATIONS

Gardner, Floyd M., "Interpolation in Digital Modems-Part I: Fundamentals," IEEE Transactions on Communications, vol. 41, No. 3, 1993, pp. 501-507.

(Continued)

*Primary Examiner* — Eva Puente
(74) *Attorney, Agent, or Firm* — Mendelsohn Dunleavy, P.C.; Yuri Gruzdkov (57) ABSTRACT

We disclose an optical receiver for direct detection of an intensity-modulated optical signal, the digital signal processor of which employs a clock-recovery circuit capable of reliably recovering the internal clock of the received optical signal without relying on dispersion-compensation processing even if the signal's eye pattern is substantially closed. In an example embodiment, the clock-recovery circuit comprises a frequency-domain phase detector that operates to determine and track in time the sampling phase using only a subset of the digital spectral components corresponding to the received optical signal. The determined sampling phase is then used to synchronize the digital electrical samples of the received optical signal with the internal clock thereof by way of digital interpolation or through appropriate control of the sampling frequency and phase of the receiver's analog-to-digital converter. Some embodiments of the clock-recovery circuit can beneficially be used in a two-channel optical receiver.

21 Claims, 6 Drawing Sheets

(56) References Cited

U.S. PATENT DOCUMENTS

| | | | |
|---|---|---|---|
| 2007/0104492 A1* | 5/2007 | Betts | H04B 10/505 |
| | | | 398/183 |
| 2010/0329677 A1 | 12/2010 | Kaneda et al. | |
| 2012/0213510 A1 | 8/2012 | Stojanovic | |
| 2012/0219302 A1 | 8/2012 | Sun et al. | |
| 2013/0028595 A1* | 1/2013 | Nakagawa | H04L 27/2657 |
| | | | 398/25 |
| 2016/0094297 A1* | 3/2016 | Xie | H04B 10/616 |
| | | | 398/202 |

OTHER PUBLICATIONS

Erup, Lars, et al., "Interpolation in Digital Modems-Part 11: Implementation and Performance," IEEE Transactions on Communications, vol. 41, No. 6, 1993, pp. 998-1008.

Gardner, Floyd, M., "A BPSK/QPSK Timing-Error Detector for Sampled Receivers," IEEE Transactions on Communications, vol. COM-34, No. 5, 1986, pp. 423-429.

Sadot, Dan, et al., "Single channel 112Gbit/sec PAM4 at 56Gbaud with digital signal processing for data centers applications," Optics Express, vol. 23, No. 2, 2015, pp. 991-997.

Randel, Sebastian A., et al., U.S. Appl. No. 14/575,596, entitled, "Reduction of Effects of Signal-Signal Beat Interference in Optical Transport Systems," filed Dec. 8, 2014, (33 pages).

International Search Report and Written Opinion; dated May 3, 2017 for PCT Application No. PCT/US2017/016910.

Stojanovic, Nebojsa, and Xie Changsong. "An efficient method for skew estimation and compensation in coherent receivers." IEEE Photonics Teohnol. Lett. 28.4 (2016): 489-492.

* cited by examiner

CLOCK RECOVERY FOR AN OPTICAL RECEIVER

BACKGROUND

Field

The present disclosure relates to optical communication equipment and, more specifically but not exclusively, to clock recovery for an optical receiver.

Description of the Related Art

This section introduces aspects that may help facilitate a better understanding of the disclosure. Accordingly, the statements of this section are to be read in this light and are not to be understood as admissions about what is in the prior art or what is not in the prior art.

Some digital data streams are transmitted without an accompanying clock signal. To recover the data from such transmissions, the receiver first generates an appropriate clock signal and then uses the generated clock signal to decode the data signal. This portion of the signal processing implemented at the receiver is commonly referred to as clock and data recovery (CDR).

CDR processing in optical receivers can be challenging if the received optical signal is distorted due to chromatic dispersion, polarization-mode dispersion, additive noise, and/or non-linear and other linear optical effects in the fiber-optic link. For example, significant problems in CDR processing may arise when signal distortions cause a substantial closure of the received signal's eye pattern. The high data rates often used in optical communications typically exacerbate and compound these problems.

SUMMARY OF SOME SPECIFIC EMBODIMENTS

Disclosed herein are various embodiments of an optical receiver for direct detection of an intensity-modulated optical signal, the digital signal processor of which employs a clock-recovery circuit capable of reliably recovering the internal clock of the received optical signal without relying on dispersion-compensation processing even if the signal's eye pattern is substantially closed. In an example embodiment, the clock-recovery circuit comprises a frequency-domain phase detector that operates to determine and track in time the sampling phase of the receiver's analog-to-digital converter using only a subset of the digital spectral components corresponding to the received optical signal. The determined sampling phase is then used to synchronize the digital electrical samples of the received optical signal with the internal clock thereof by way of digital interpolation or through appropriate control of the sampling frequency and phase of the receiver's analog-to-digital converter. Some embodiments of the clock-recovery circuit can beneficially be used in a two-channel optical receiver.

According to one embodiment, provided is an apparatus comprising: a first optical detector configured to convert a first optical input signal into a first electrical signal proportional to an optical power of the first optical input signal; a first analog-to-digital converter configured to generate a first sequence of digital electrical samples by digitally sampling the first electrical signal; and a digital signal processor configured to: apply a Fourier-transform operation to the first sequence of digital electrical samples to generate a first set of digital spectral components; separate the first set of digital spectral components into a first subset and a second subset of digital spectral components; compute a first sampling phase using the first subset of digital spectral components; and recover data encoded in the first optical input signal using the first sampling phase.

According to another embodiment, provided is a method of manufacturing a device, the method comprising the step of configuring a digital signal processor to: apply a Fourier-transform operation to a first sequence of digital electrical samples to generate a first set of digital spectral components; separate the first set of digital spectral components into a first subset and a second subset of digital spectral components; compute a first sampling phase using the first subset of digital spectral components; and recover data encoded in a first optical input signal using the first sampling phase; and wherein the device comprises: a first optical detector configured to convert the first optical input signal into a first electrical signal proportional to an optical power of the first optical input signal; a first analog-to-digital converter configured to generate the first sequence of digital electrical samples by digitally sampling the first electrical signal; and the digital signal processor.

BRIEF DESCRIPTION OF THE DRAWINGS

Other aspects, features, and benefits of various disclosed embodiments will become more fully apparent, by way of example, from the following detailed description and the accompanying drawings, in which.

DETAILED DESCRIPTION

Figure 1:
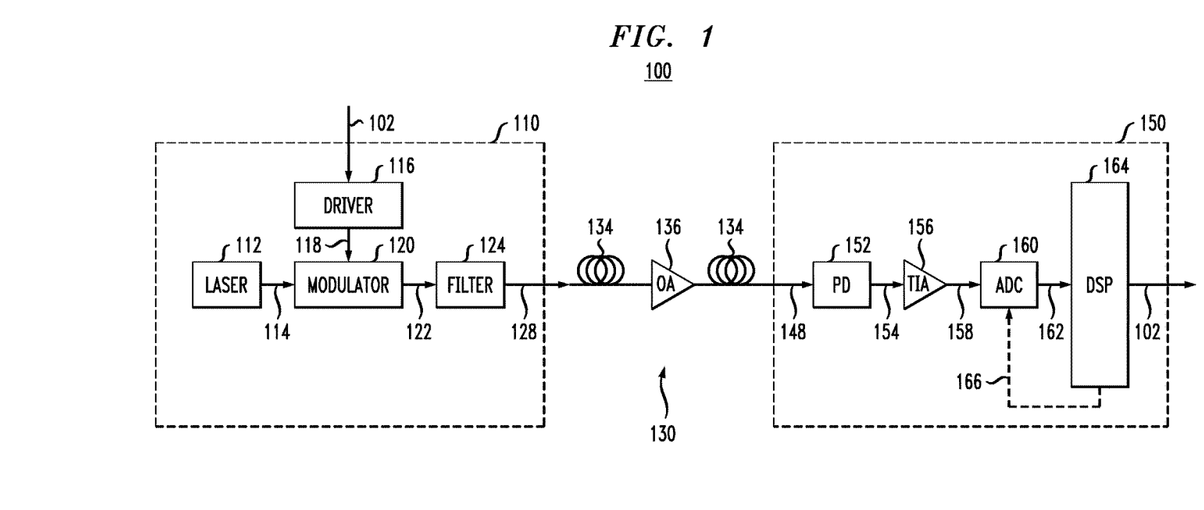
FIG. 1 shows a block diagram of an optical communication system according to an embodiment.

FIG. 1 shows a block diagram of an optical communication system 100 according to an embodiment. System 100 includes an optical transmitter 110 and an optical receiver 150 that are optically coupled to one another by way of a fiber-optic link 130. In an example embodiment, fiber-optic link 130 is an amplified optical link having one or more optical amplifiers therein, such as an optical amplifier 136 coupled between the corresponding sections of optical fiber 134.

Optical transmitter 110 is configured to generate a modulated optical output signal 128 having encoded thereon an input data stream 102 using single sideband (SSB) pulse-amplitude modulation (PAM), such as PAM-4, or another suitable modulation format. In an example embodiment, optical transmitter 110 comprises a laser 112, a driver circuit 116, an optical modulator 120, and an optical filter 124. In operation, laser 112 generates an optical carrier wave 114 that is applied to optical modulator 120. Driver circuit 116 converts input data stream 102 into an electrical drive signal 118 and applies this electrical drive signal to optical modulator 120, thereby causing the optical modulator to modulate optical carrier wave 114. A resulting modulated optical signal 122 generated in this manner by optical modulator 120 is optically filtered by optical filter 124 to substantially remove or significantly attenuate one of the two modulation sidebands. A resulting filtered optical signal outputted by optical filter 124 is the modulated optical output signal 128. Eq. (1) provides a mathematical expression that approximately describes the electric field, E(t), of modulated optical signal 128:

$$E(t) = E_0(1 + \alpha(m(t) + j\hat{m}(t)))e^{j\omega_0 t} \quad (1)$$

where t is time; $E_0$ is the electric-field amplitude; $1/\alpha$ is the carrier-to-signal ratio; m(t) is the modulation waveform; $\hat{m}(t)$ is the Hilbert transform of m(t); and $\omega_0$ is the optical carrier frequency. Herein, the PAM signal is shaped into an SSB form, e.g., to enable the signal to propagate longer distances without being subjected to catastrophic levels of signal fading.

After being transmitted through fiber-optic link 130, modulated optical signal 128 is transformed into a modulated optical signal 148 that provides optical input to optical receiver 150. Compared to signal 128, signal 148 is typically noisier and more distorted, e.g., due to various transmission impediments imposed by fiber-optic link 130. As already indicated above, some of the signal distortions in modulated optical signal 148 may be due to chromatic dispersion, polarization-mode dispersion, additive noise, and/or other detrimental optical effects in fiber-optic link 130.

Optical receiver 150 is configured to process modulated optical signal 148 to recover data stream 102, which is then directed to external circuits or devices (not explicitly shown in FIG. 1). More specifically, a photodetector (e.g., photodiode) 152 operates to convert optical signal 148 into a corresponding electrical signal 154 using conventional square-law detection. Electrical signal 154 is amplified in a transimpedance amplifier (TIA) 156, and a resulting amplified electrical signal 158 is converted into digital form by an analog-to-digital converter (ADC) 160. A digital signal processor (DSP) 164 then processes a resulting digital electrical signal 162 generated by ADC 160 to recover data stream 102. The processing implemented in DSP 164 includes, inter alia, CDR processing, example embodiments of which are described in more detail below in reference to FIGS. 2-7.

ADC 160 generates digital electrical signal 162 by sampling amplified electrical signal 158 using an appropriate sampling frequency and a sampling phase set by a control signal 166. In some embodiments, control signal 166 may have a frequency that is two times higher than the nominal symbol rate of optical signal 148, but otherwise is not synchronized with the internal clock of that optical signal. In some other embodiments, control signal 166 may be generated using a clock-recovery circuit of DSP 164, e.g., as described in more detail below in reference to FIGS. 4-5.

Figure 2:
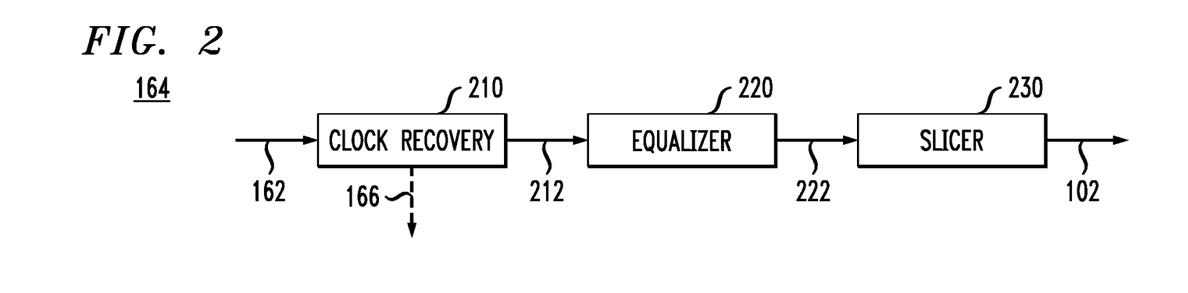
FIG. 2 shows a block diagram of a digital signal processor that can be used in the optical communication system of FIG. 1 according to an embodiment.

FIG. 2 shows a block diagram of DSP 164 (FIG. 1) according to an embodiment. Digital electrical signal 162, optional control signal 166, and output data stream 102 (FIG. 1) are also shown in FIG. 2. In an example embodiment, DSP 164 comprises a clock-recovery circuit 210, a signal equalizer 220, and a slicer 230. A person of ordinary skill in the art will understand that DSP 164 may include additional known signal-processing circuits, such as an electronic dispersion compensator, in alternative embodiments thereof.

Clock recovery implemented in clock-recovery circuit 210 is generally directed at synchronizing the digital signal processing performed in DSP 164 with the internal clock of optical signal 148. In an example embodiment, clock-recovery circuit 210 operates to (i) extract a clock signal from digital electrical signal 162 and (ii) process the data samples carried by digital electrical signal 162 in a manner that causes a resulting digital electrical signal 212 to carry the corresponding data samples that are synchronized, in frequency and phase, with the internal clock of optical signal 148. In some embodiments, clock-recovery circuit 210 may also be configured to generate control signal 166, which is fed back to ADC 160 (see FIG. 1) to set the sampling rate and phase thereof. Example embodiments of clock-recovery circuit 210 are described in more detail below in reference to FIGS. 3-6. Some embodiments of clock-recovery circuit 210 may benefit from the use of clock-recovery techniques disclosed, e.g., in U.S. Pat. No. 8,655,191, which is incorporated herein by reference in its entirety.

Signal equalization implemented in signal equalizer 220 is generally directed at reducing the detrimental effects of various signal impairments (i) imparted onto optical signal 148 in fiber-optic link 130 (FIG. 1) and (ii) further imparted onto digital electrical signal 162 by the front end (upstream circuitry) of optical receiver 150. A general purpose of this signal equalization is to reduce the bit-error rate (BER) of the recovered data stream 102. Note that signal equalizer 220 is located downstream from clock-recovery circuit 210, which means that the clock recovery circuit operates to recover the clock signal without relying on the equalization processing, such as dispersion compensation, implemented in the signal equalizer. Some embodiments of signal equalizer 220 may benefit from the use of linear and/or non-linear signal-equalization techniques disclosed, e.g., in (i) the commonly owned U.S. patent application Ser. No. 14/575, 596 and (ii) the article by Dan Sadot, G. Dorman, Albert Gorshtein, et al., entitled "Single channel 112 Gbit/sec PAM4 at 56 Gbaud with digital signal processing for data centers applications," published in OPTICS EXPRESS, 2015, Vol. 23, No. 2, pp. 991-997, both of which are incorporated herein by reference in their entirety.

In an example embodiment, slicer 230 may employ one or more dynamically adjustable asymmetric thresholds to properly determine the signal levels in an equalized digital signal 222 received from signal equalizer 220. The threshold adjustment in slicer 230 is typically carried out in a manner that causes further reduction in the BER of the recovered data stream 102.

Figure 3:
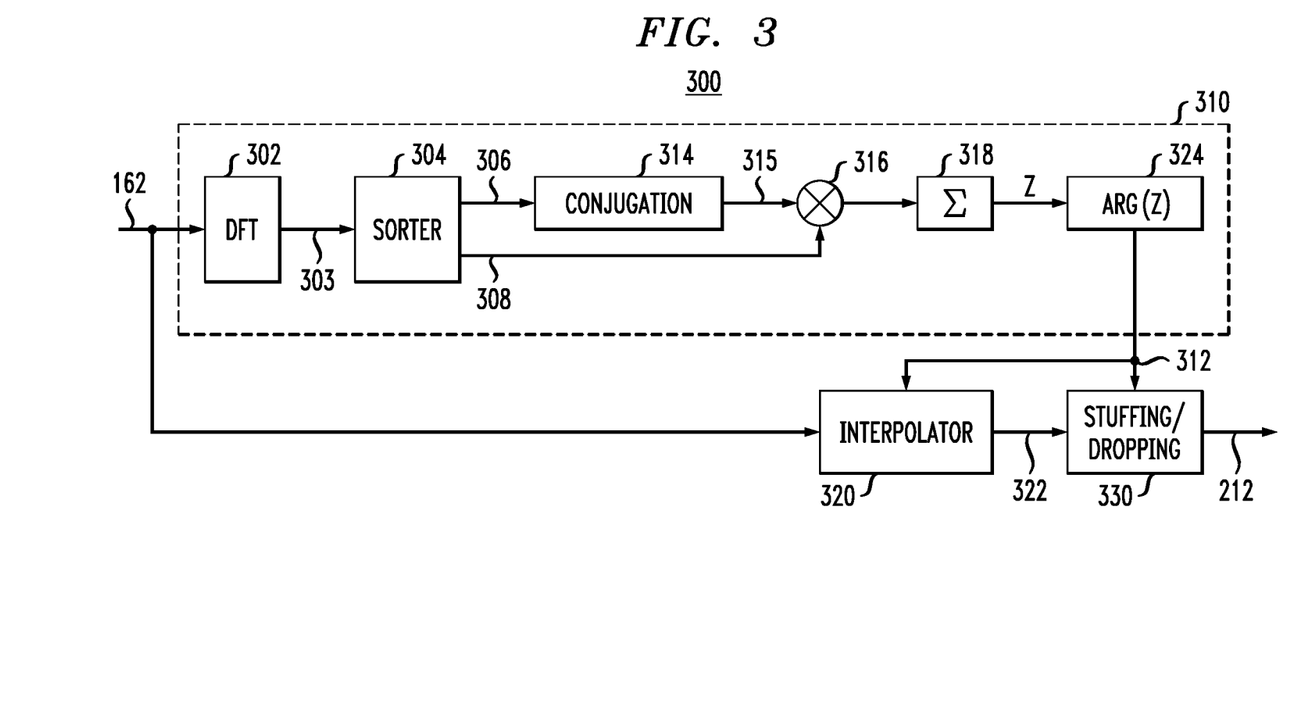
FIG. 3 shows a block diagram of a clock-recovery circuit that can be used in the digital signal processor of FIG. 2 according to an embodiment.

FIG. 3 shows a block diagram of a clock-recovery circuit 300 that can be used as clock-recovery circuit 210 (FIG. 2) according to an embodiment. In an example embodiment, clock-recovery circuit 300 comprises a phase detector 310, an interpolator 320, and a stuffing/dropping circuit 330. Clock-recovery circuit 300 is not configured to generate control signal 166 (also see FIGS. 1-2).

In operation, phase detector 310 tracks the average phase of an inherent clock tone present in digital electrical signal 162 to generate a control signal 312 for interpolator 320 and stuffing/dropping circuit 330. Interpolator 320 uses control signal 312 to convert digital electrical signal 162 into a corresponding digital electrical signal 322. Recall that digital electrical signal 162 carries real-valued digital samples generated at the sampling rate and phase of ADC 160 (FIG. 1). As already indicated above, in some embodiments, the sampling rate and phase of ADC 160 are not locked to the internal clock of optical signal 148 (FIG. 1). The interpolation performed by interpolator 320 serves to cause the digital samples carried by digital electrical signal 322 to be frequency- and phase-locked to the internal clock of optical signal 148. In an example embodiment, interpolator 320 can be implemented using a sixth order Lagrange fractional delay filter. In alternative embodiments, other suitable interpolators may similarly be used as interpolator 320.

Stuffing/dropping circuit 330 removes detrimental manifestations of the technically limited phase range covered by phase detector 310. More specifically, phase detector 310 can typically determine the phase of the inherent clock tone with an uncertainty of about 2πm (where m is an integer) by generating the phase values in the phase range between 0 and 2π radian. This uncertainty typically leads to an occasional discontinuity of about 2π in the output of phase detector 310 when the phase of the clock tone drifts outside the [0, 2π] phase range. Stuffing/dropping circuit 330 operates to (i) add (stuff) an additional signal sample to (into) digital electrical signal 322 when the phase of the clock tone crosses the 2π phase-range boundary and (ii) remove (drop) an extra signal sample from digital electrical signal 322 when the phase of the clock tone crosses the 0 phase-range boundary. The output signal generated in this manner by stuffing/dropping circuit 330 is digital electrical signal 212 (also see FIG. 2).

In an example embodiment, phase detector 310 is a frequency-domain phase detector configured to apply a discrete (e.g., fast) Fourier transform to a relatively long sequence of digital samples provided by digital electrical signal 162. The length of this sequence is an algorithm parameter that is selected to enable phase detector 310 to track the phase of the clock tone relatively reliably and accurately. The reliability and accuracy typically improve with the use of longer sequences. For example, when optical signal 148 is a 56-GBaud vestigial sideband PAM-4 optical signal traveling through approximately 80 km of standard single-mode fiber, a sufficient length of the sequence for the Fourier transform used in phase detector 310 has been determined to be about 128 samples.

Phase detector 310 comprises a discrete Fourier transform (DFT) circuit 302 configured to periodically apply the above-described Fourier transform to a current sequence of digital samples received via digital electrical signal 162 to generate a corresponding set of digital spectral components 303. Unlike the digital samples of digital electrical signal 162, which are real-valued, digital spectral components 303 are complex-valued due to the properties of the Fourier transform.

Phase detector 310 further comprises a sorter 304 that operates to sort (or separate) the set of digital spectral components 303 generated by DFT circuit 302 into two subsets, labeled in FIG. 3 as 306 and 308, respectively. In an example embodiment, the subset 306 includes N/2 digital spectral components 303 located at positive frequencies, and the subset 308 includes N/2 digital spectral components 303 located at negative frequencies, where N is the total number of digital spectral components 303 generated by DFT circuit 302 by applying the above-described Fourier transform. A conjugation circuit 314 then applies complex conjugation to the digital spectral components of the subset 306, thereby generating a corresponding set 315 of conjugated digital spectral components.

A multiplier 316 and an adder 318 further process the subset 308 and the set 315 to generate a complex-valued measure (Z) of the clock tone. More specifically, multiplier 316 and adder 318 are configured to generate the complex-valued measure Z in accordance with Eq. (2):

$$Z = \sum_{n=1}^{n=\frac{N}{2}-1} X(n)X^*\left(n+\frac{N}{2}\right) \qquad (2)$$

where X(k) generally denotes the k-th digital spectral component 303; X(n) denotes the digital spectral components of the subset 308; and X*(n+N/2) denotes the digital spectral components of the set 315. In other words, multiplier 316 operates to generate N/2−1 complex values, each being a product of a digital spectral component from the subset 308 and a corresponding digital spectral component from the set 315. Note that the summation in Eq. (2) starts from n=1 to exclude the DC spectral component at n=0. Adder 318 then sums up these N/2−1 complex values to generate the complex-valued measure Z.

A clock-phase estimator 324 is configured to generate control signal 312 by determining the argument (complex-plane phase) of the complex-valued measure Z. As already indicated above, interpolator 320 and stuffing/dropping circuit 330 then operate to resample digital electrical signal 162 to generate digital electrical signal 212. Recall that digital electrical signal 212 carries digital samples that are synchronized, in frequency and phase, with the internal clock of optical signal 148.

Figure 4:
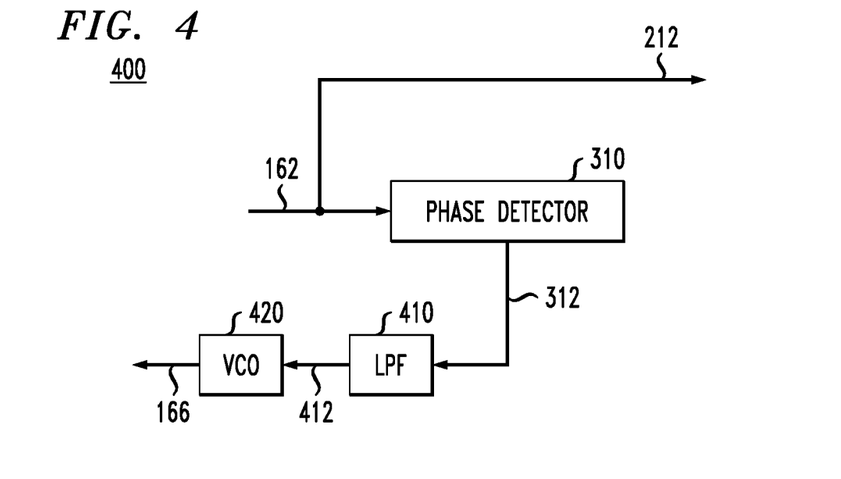
FIG. 4 shows a block diagram of a clock-recovery circuit that can be used in the digital signal processor of FIG. 2 according to an alternative embodiment.

FIG. 4 shows a block diagram of a clock-recovery circuit 400 that can be used as clock-recovery circuit 210 (FIG. 2) according to an alternative embodiment. Similar to clock-recovery circuit 300 (FIG. 3), clock-recovery circuit 400 employs phase detector 310. However, unlike clock-recovery circuit 300 (FIG. 3), clock-recovery circuit 400 is configured to generate control signal 166 (also see FIGS. 1-2).

In operation, clock-recovery circuit 400 generates control signal 166 in a manner that causes ADC 160 to sample electrical signal 158 at the sampling rate and phase that are substantially locked to the internal clock of optical signal 148 (also see FIG. 1). More specifically, clock-recovery circuit 400 uses a low-pass filter (LPF) 410 to average control signal 312 over several Fourier transforms. A resulting filtered signal 412 generated in this manner by low-pass filter 410 is applied to a voltage-controlled oscillator (VCO) 420. The output of voltage-controlled oscillator 420 is control signal 166.

Figure 5:
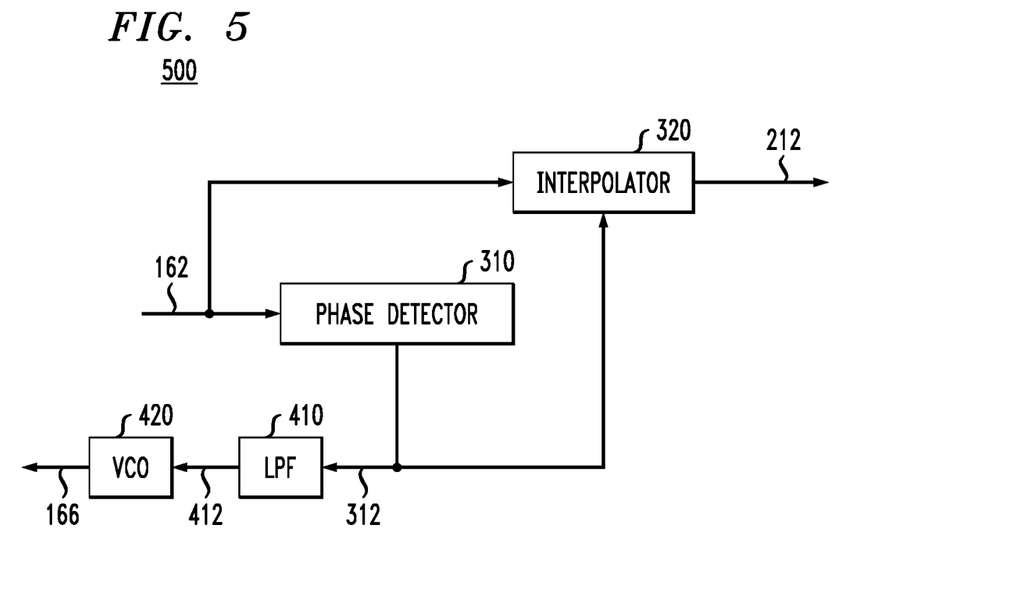
FIG. 5 shows a block diagram of a clock-recovery circuit that can be used in the digital signal processor of FIG. 2 according to another alternative embodiment.

FIG. 5 shows a block diagram of a clock-recovery circuit 500 that can be used as clock-recovery circuit 210 (FIG. 2) according to another alternative embodiment. Clock-recovery circuit 500 is generally similar to clock-recovery circuit 400, but also includes interpolator 320 (also used in clock-recovery circuit 300, FIG. 3). This particular embodiment of clock-recovery circuit 210 may be useful when the signal clock undergoes both relatively fast fluctuations and a relatively slow drift. In this situation, the relatively slow drift is addressed by way of the feedback to ADC 160 provided by control signal 166, while interpolator 320 is able to address the relatively fast fluctuations.

Figure 6:
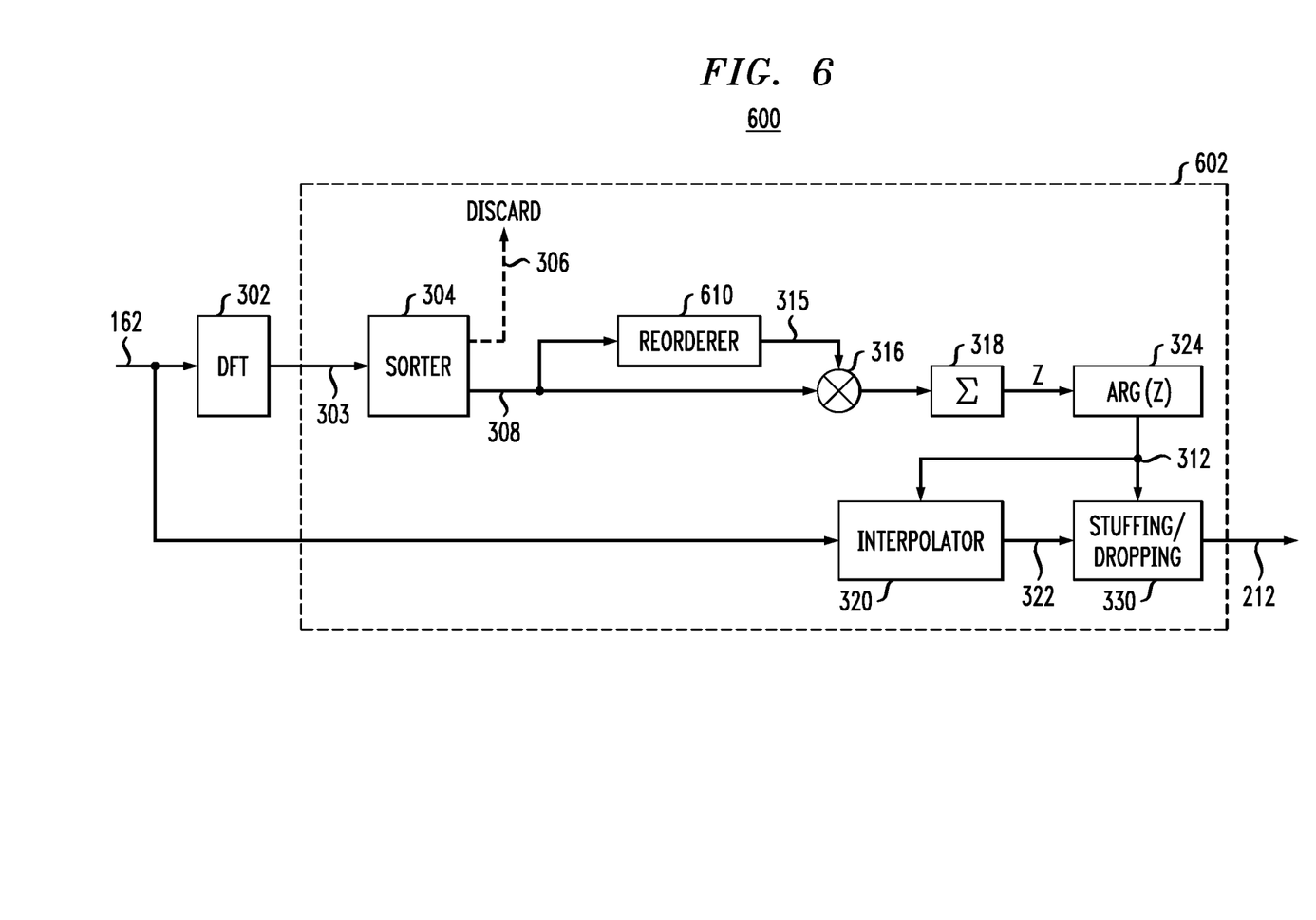
FIG. 6 shows a block diagram of a clock-recovery circuit that can be used in the digital signal processor of FIG. 2 according to yet another alternative embodiment.

FIG. 6 shows a block diagram of a clock-recovery circuit 600 that can be used as clock-recovery circuit 210 (FIG. 2) according to yet another alternative embodiment. Clock-recovery circuit 600 is generally similar to clock-recovery circuit 300 (FIG. 3) and reuses many constituent circuits of the latter. However, the structure of the phase detector used in clock-recovery circuit 600 is somewhat different from the structure of phase detector 310 used in clock-recovery circuit 300.

More specifically, the phase detector used in clock-recovery circuit 600 relies on the inherent symmetry of the set of digital spectral components 303 generated by DFT circuit 302 from a real-valued input provided by digital electrical signal 162. This inherent symmetry is expressed by Eq. (3):

$$X(n)=X^*(N-n) \quad (3)$$

where X(k) generally denotes the k-th digital spectral component 303; N is the total number of digital spectral components 303 in the Fourier transform generated by DFT circuit 302; and n={0, 2, ..., N-1}. Using the DFT symmetry expressed by Eq. (3), Eq. (2) can be equivalently written as:

$$Z = \sum_{n=1}^{n=N/2-1} X(n)X\left(\frac{N}{2}-n\right). \quad (4)$$

Analysis of Eq. (4) reveals that the complex-valued measure Z can be calculated based on the subset 308 only, and without the use of the subset 306. In particular, Eqs. (3)-(4) show that the set 315, which is used in the calculation of Z in clock-recovery circuit 300 and is generated therein by conjugating the subset 306 (see FIG. 3), can alternatively be generated by straightforward reordering of the subset 308. Accordingly, in clock-recovery circuit 600, the subset 306 is discarded (or not calculated at all), and a reorderer 610 is used to appropriately reorder a copy of the subset 308 received from sorter 304 to generate the set 315. The rest of the signal processing in clock-recovery circuit 600 is the same as in clock-recovery circuit 300.

Figure 7:
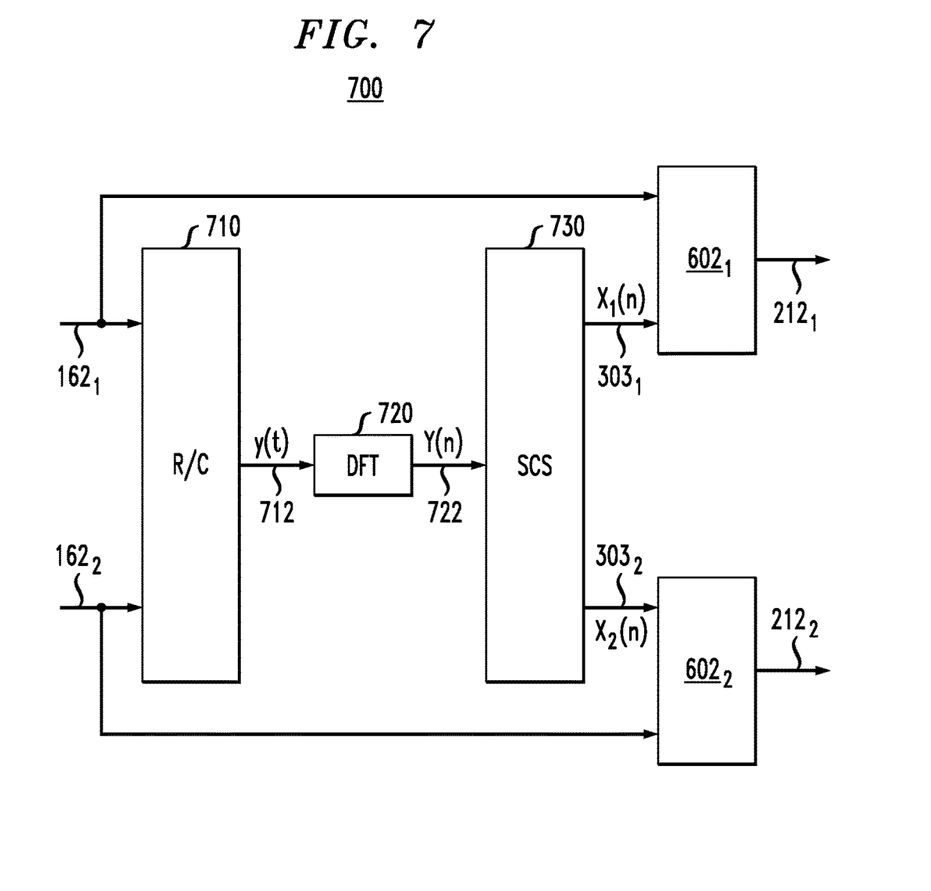
FIG. 7 shows a block diagram of a two-channel clock-recovery circuit according to an embodiment.

FIG. 7 shows a block diagram of a two-channel clock-recovery circuit 700 according to an embodiment. Clock-recovery circuit 700 can be used, e.g., in CDR processing for two independent optical channels if the clocks corresponding to these two channels nominally have the same frequency but are not identical to one another, or have sufficiently close non-identical frequencies. The two independent optical channels may correspond to two different carrier wavelengths in a WDM communication system or be set up using another suitable optical multiplexing technique, as known in the art. A person of ordinary skill in the art will understand how to modify the front end of optical receiver 150 (FIG. 1) to convert it into a multi-channel optical receiver (also see FIG. 8). The use of clock-recovery circuit 700 in the DSP of a multi-channel optical receiver may be beneficial because it tends to reduce the DSP complexity and cost through the use of hardware that can be shared by two different channels.

Clock-recovery circuit 700 comprises two instances (nominal copies) of a circuit 602, which is used in clock-recovery circuit 600 (see FIG. 6). These two instances of circuit 602 are labeled in FIG. 7 as $602_1$ and $602_2$, respectively. The digital signal samples corresponding to the first optical channel are applied to clock-recovery circuit 700 by way of a digital electrical signal $162_1$. The corresponding synchronized digital electrical signal is generated by circuit $602_1$ and is labeled as $212_1$. The digital signal samples corresponding to the second optical channel are applied to clock-recovery circuit 700 by way of a digital electrical signal $162_2$. The corresponding synchronized digital electrical signal is generated by circuit $602_2$ and is labeled as $212_2$.

Clock-recovery circuit 700 differs from any of clock-recovery circuits 300, 400, 500, and 600 (FIGS. 3-6) in that clock-recovery circuit 700 employs a DFT circuit 720 configured to operate on a complex-valued digital input signal 712. In contrast, each of clock-recovery circuits 300, 400, 500, and 600 employs DFT circuit 302 configured to operate on real-valued digital input signal 162. Complex-valued digital input signal 712 is generated in clock-recovery circuit 700 by a real-to-complex (R/C) signal converter 710 that converts two real-valued digital input signals $162_1$ and $162_2$ into the corresponding complex-valued digital signal based on Eq. (5):

$$y(t)=x_1(t)+jx_2(t) \quad (5)$$

where t is time; y(t) denotes a complex-valued digital sample carried by signal 712; $x_1(t)$ denotes a real-valued digital sample carried by signal $162_1$; and $x_2(t)$ denotes a real-valued digital sample carried by signal $162_2$. DFT circuit 720 applies a DFT operation to a sequence of complex-valued digital samples y(t), thereby converting it into a corresponding sequence {Y(n)} of complex-valued spectral components that are outputted by the DFT circuit by way of a complex-valued digital signal 722.

The complex-valued spectral components Y(n) generated by DFT circuit 720 have contributions from both the spectral components corresponding to real-valued digital input signal $162_1$ and the spectral components corresponding to real-valued digital input signal $162_2$. A spectral-component separator (SCS) circuit 730 processes the complex-valued spectral components Y(n) provided by complex-valued digital signal 722 to disentangle these contributions and recover the corresponding values of $X_1(n)$ and $X_2(n)$. Here, $X_1(n)$ denotes the digital spectral components corresponding to digital electrical signal $162_1$, and $X_2(n)$ denotes the digital spectral components corresponding to digital electrical signal $162_2$. The corresponding sets of the digital spectral components $X_1(n)$ and $X_2(n)$ are denoted in FIG. 7 as $303_1$ and $303_2$, respectively. In an example embodiment, the processing carried out by SCS circuit 730 is based on the following equations:

$$X_1(n)=0.5\{Y(n)+Y^*(N-n)\} \quad (6a)$$

$$X_2(n)=-0.5j\{Y(n)-Y^*(N-n)\}. \quad (6b)$$

Circuits $602_1$ and $602_2$ operate to process the sets $303_1$ and $303_2$, respectively, as described in reference to FIG. 6 to generate the corresponding synchronized digital electrical signals $212_1$ and $212_2$.

Figure 8:
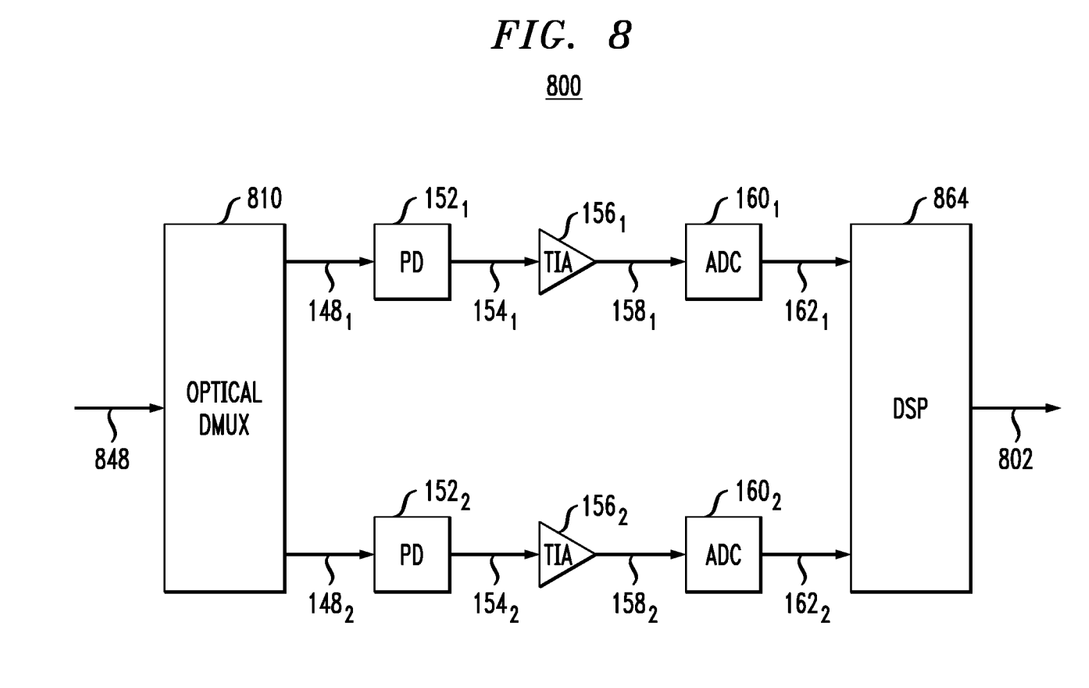
FIG. 8 shows a block diagram of an optical receiver that can employ the two-channel clock-recovery circuit of FIG. 7 according to an embodiment.

FIG. 8 shows a block diagram of an optical receiver 800 that can employ two-channel clock-recovery circuit 700 (FIG. 7) according to an embodiment. Optical receiver 800 uses an optical de-multiplexer (DMUX) 810 to de-multiplex a multiplexed optical input signal 848 into its two constituent components, labeled in FIG. 8 as $148_1$ and $148_2$, respectively. Depending on the type of optical-signal multiplexing used at the remote transmitter (not explicitly shown in FIG. 8) to generate multiplexed optical input signal 848, optical DMUX 810 can be a wavelength DMUX, a polarization DMUX, a spatial-mode DMUX, etc. A first channel of optical receiver 800 (comprising PD $152_1$, TIA $156_1$, and ADC $160_1$) processes optical signal $148_1$ to convert it into a corresponding digital electrical signal $162_1$ in the same manner as the front end of optical receiver 150 (FIG. 1). A second channel of optical receiver 800 (comprising PD $152_2$, TIA $156_2$, and ADC $160_2$) similarly processes optical signal $148_2$ to convert it into a corresponding digital electrical signal $162_2$. A DSP 864 then processes digital electrical signals 162₁ and 162₂ to recover data 802 encoded in optical input signal 848. The latter processing includes, inter alia, the CDR processing implemented using two-channel clock-recovery circuit 700 (FIG. 7).

According to an example embodiment disclosed above in reference to FIGS. 1-8, provided is an apparatus (e.g., 100, FIG. 1; 800, FIG. 8) comprising: a first optical detector (e.g., 152, FIGS. 1, 8) configured to convert a first optical input signal (e.g., 148, FIGS. 1, 8) into a first electrical signal (e.g., 154, FIGS. 1, 8) proportional to an optical power of the first optical input signal; a first analog-to-digital converter (e.g., 160, FIGS. 1, 8) configured to generate a first sequence of digital electrical samples (e.g., carried by 162, FIGS. 1, 8) by digitally sampling the first electrical signal; and a digital signal processor (e.g., 164, FIG. 1; 864, FIG. 8) configured to: apply a Fourier-transform operation (e.g., using 302, FIGS. 3, 6; 720, FIG. 7) to the first sequence of digital electrical samples to generate a first set (e.g., 303, FIGS. 3, 6, 7) of digital spectral components; separate (e.g., using 304, FIGS. 3, 6) the first set of digital spectral components into a first subset (e.g., 308, FIGS. 3, 6) and a second subset (e.g., 306, FIGS. 3, 6) of digital spectral components; compute (e.g., using 310, FIGS. 3-5; 602, FIGS. 6-7) a first sampling phase using the first subset of digital spectral components; and recover data (e.g., 102, FIGS. 1, 2) encoded in the first optical input signal using the first sampling phase.

In some embodiments of the above apparatus, the first optical input signal is a pulse-amplitude-modulated optical signal.

In some embodiments of any of the above apparatus, the first optical input signal is a single-sideband optical signal.

In some embodiments of any of the above apparatus, the digital signal processor is further configured to discard (e.g., as shown in FIG. 6) the second subset of digital spectral components.

In some embodiments of any of the above apparatus, the digital signal processor is further configured to: apply a complex-conjugation operation (e.g., using 314, FIG. 3) to the second subset of digital spectral components to generate a corresponding conjugated set (e.g., 315, FIG. 3) of digital spectral components; and compute the first sampling phase using said corresponding conjugated set of digital spectral components.

In some embodiments of any of the above apparatus, the digital signal processor is further configured to: multiply (e.g., using 316, FIG. 3) the digital spectral components of the first subset by the digital spectral components of the corresponding conjugated set to generate a corresponding set of products; generate (e.g., using 318, FIG. 3) a sum (e.g., Z, FIG. 3) of said products; and compute (e.g., using 324, FIG. 3) the first sampling phase using a phase of said sum.

In some embodiments of any of the above apparatus, the digital signal processor is further configured to: reorder (e.g., using 610, FIG. 6) to the first subset of digital spectral components to generate a corresponding reordered set (e.g., 315, FIG. 6) of digital spectral components; and compute the first sampling phase using said corresponding reordered set of digital spectral components.

In some embodiments of any of the above apparatus, the digital signal processor is further configured to: multiply (e.g., using 316, FIG. 6) the digital spectral components of the first subset by the digital spectral components of the corresponding reordered set to generate a corresponding set of products; generate (e.g., using 318, FIG. 6) a sum (e.g., Z, FIG. 6) of said products; and compute (e.g., using 324, FIG. 6) the first sampling phase using a phase of said sum.

In some embodiments of any of the above apparatus, the digital signal processor is further configured to interpolate (e.g., using 320, FIGS. 3, 5, 6) the first sequence of digital electrical samples to generate a corresponding interpolated sequence of digital electrical samples (e.g., carried by 212, FIGS. 2, 3, 5, 6, 7), each having a timing corresponding to the first sampling phase.

In some embodiments of any of the above apparatus, the first analog-to-digital converter is further configured (e.g., based on 166, FIGS. 1, 2, 4, 5) to generate the first sequence of digital electrical samples by digitally sampling the first electrical signal using the first sampling phase.

In some embodiments of any of the above apparatus, the digital signal processor is further configured to interpolate (e.g., using 320, FIG. 5) the first sequence of digital electrical samples to generate a corresponding interpolated sequence of digital electrical samples (e.g., carried by 212, FIG. 5), each having a timing corresponding to the first sampling phase.

In some embodiments of any of the above apparatus, the first sequence of digital electrical samples comprises real-valued samples.

In some embodiments of any of the above apparatus, the first sequence of digital electrical samples consists of real-valued samples.

In some embodiments of any of the above apparatus, the apparatus further comprises an optical de-multiplexer (e.g., 810, FIG. 8) configured to generate the first optical input signal and a second optical input signal (e.g., 148₂, FIG. 8) by optically de-multiplexing a multiplexed optical signal (e.g., 848, FIG. 8).

In some embodiments of any of the above apparatus, the apparatus further comprises: a second optical detector (e.g., 152₂, FIG. 8) configured to convert the second optical input signal into a second electrical signal (e.g., 154₂, FIG. 8) proportional to an optical power of the second optical input signal; and a second analog-to-digital converter (e.g., 160₂, FIG. 8) configured to generate a second sequence of digital electrical samples (e.g., carried by 162₂, FIG. 8) by digitally sampling the second electrical signal; and wherein the digital signal processor is further configured to: convert (e.g., using 710, FIG. 7) the first sequence of digital electrical samples and the second sequence of digital electrical samples into a corresponding sequence of complex-valued samples (e.g., carried by 712, FIG. 7), each of said complex-valued samples having a respective digital electrical sample of the first sequence as a real part and a respective digital electrical sample of the first sequence as an imaginary part; and compute (e.g., using 720, 730, 602₁, FIG. 7) the first sampling phase using said corresponding sequence of complex-valued samples.

In some embodiments of any of the above apparatus, the digital signal processor is further configured to: apply a Fourier-transform operation (e.g., using 720, FIG. 7) to said corresponding sequence of complex-valued samples to generate a set of complex-valued spectral components (e.g., 722, FIG. 7) of digital spectral components; compute (e.g., using 730, FIG. 7) the first set of digital spectral components (e.g., 303₁, FIG. 7) using the set of complex-valued spectral components; compute (e.g., using 730, FIG. 7) a second set of digital spectral components (e.g., 303₂, FIG. 7) using the set of complex-valued spectral components, said second set of digital spectral components corresponding to the second sequence of digital electrical samples; separate (e.g., using 602₂, FIG. 7) the second set of digital spectral components into a third subset (e.g., 308, FIG. 6) and a fourth subset (e.g., 306, FIG. 6) of digital spectral components; compute (e.g., using 602₂, FIG. 7) a second sampling phase using the third subset of digital spectral components; and recover data (e.g., part of 802, FIG. 8) encoded in the second optical input signal using the second sampling phase.

In some embodiments of any of the above apparatus, each of the first sequence of digital electrical samples and the second sequence of digital electrical samples comprises real-valued samples.

In some embodiments of any of the above apparatus, each of the first sequence of digital electrical samples and the second sequence of digital electrical samples consists of real-valued samples.

In some embodiments of any of the above apparatus, the optical de-multiplexer comprises a wavelength de-multiplexer configured to de-multiplex the multiplexed optical signal based on carrier wavelength.

In some embodiments of any of the above apparatus, the optical de-multiplexer comprises a polarization de-multiplexer configured to de-multiplex the multiplexed optical signal based on polarization.

In some embodiments of any of the above apparatus, the optical de-multiplexer comprises a spatial-mode de-multiplexer configured to de-multiplex the multiplexed optical signal based on transverse waveguide modes of a multimode mode fiber carrying the multiplexed optical signal.

In some embodiments of any of the above apparatus, the digital signal processor is configured to compute the first sampling phase without relying on dispersion-compensation processing.

According to another example embodiment disclosed above in reference to FIGS. 1-8, provided is a method of manufacturing a device (e.g., 150, FIG. 1), the method comprising the step of configuring a digital signal processor (e.g., 164, FIG. 1; 864, FIG. 8) to: (i) apply a Fourier-transform operation (e.g., using 302, FIGS. 3, 6; 720, FIG. 7) to a first sequence of digital electrical samples to generate a first set (e.g., 303, FIGS. 3, 6, 7) of digital spectral components; (ii) separate (e.g., using 304, FIGS. 3, 6) the first set of digital spectral components into a first subset (e.g., 308, FIGS. 3, 6) and a second subset (e.g., 306, FIGS. 3, 6) of digital spectral components; (iii) compute (e.g., using 310, FIGS. 3-5; 602, FIGS. 6-7) a first sampling phase using the first subset of digital spectral components; and (iv) recover data (e.g., 102, FIGS. 1, 2) encoded in a first optical input signal (e.g., 148, FIGS. 1, 8) using the first sampling phase; and wherein the device comprises: (A) a first optical detector (e.g., 152, FIGS. 1, 8) configured to convert the first optical input signal into a first electrical signal (e.g., 154, FIGS. 1, 8) proportional to an optical power of the first optical input signal; (B) a first analog-to-digital converter (e.g., 160, FIGS. 1, 8) configured to generate the first sequence of digital electrical samples (e.g., carried by 162, FIGS. 1, 8) by digitally sampling the first electrical signal; and (C) the digital signal processor.

While this disclosure includes references to illustrative embodiments, this specification is not intended to be construed in a limiting sense. Various modifications of the described embodiments, as well as other embodiments within the scope of the disclosure, which are apparent to persons skilled in the art to which the disclosure pertains are deemed to lie within the principle and scope of the disclosure, e.g., as expressed in the following claims.

Some embodiments can be embodied in the form of methods and apparatuses for practicing those methods. Some embodiments can also be embodied in the form of program code recorded in tangible media, such as magnetic recording media, optical recording media, solid state memory, floppy diskettes, CD-ROMs, hard drives, or any other non-transitory machine-readable storage medium, wherein, when the program code is loaded into and executed by a machine, such as a computer, the machine becomes an apparatus for practicing the patented invention(s). Some embodiments can also be embodied in the form of program code, for example, stored in a non-transitory machine-readable storage medium including being loaded into and/or executed by a machine, wherein, when the program code is loaded into and executed by a machine, such as a computer or a processor, the machine becomes an apparatus for practicing the patented invention(s). When implemented on a general-purpose processor, the program code segments combine with the processor to provide a unique device that operates analogously to specific logic circuits.

Unless explicitly stated otherwise, each numerical value and range should be interpreted as being approximate as if the word "about" or "approximately" preceded the value or range.

It will be further understood that various changes in the details, materials, and arrangements of the parts which have been described and illustrated in order to explain the nature of this disclosure may be made by those skilled in the art without departing from the scope of the disclosure, e.g., as expressed in the following claims.

Although the elements in the following method claims, if any, are recited in a particular sequence with corresponding labeling, unless the claim recitations otherwise imply a particular sequence for implementing some or all of those elements, those elements are not necessarily intended to be limited to being implemented in that particular sequence.

Reference herein to "one embodiment" or "an embodiment" means that a particular feature, structure, or characteristic described in connection with the embodiment can be included in at least one embodiment of the disclosure. The appearances of the phrase "in one embodiment" in various places in the specification are not necessarily all referring to the same embodiment, nor are separate or alternative embodiments necessarily mutually exclusive of other embodiments. The same applies to the term "implementation."

Also for purposes of this description, the terms "couple," "coupling," "coupled," "connect," "connecting," or "connected" refer to any manner known in the art or later developed in which energy is allowed to be transferred between two or more elements, and the interposition of one or more additional elements is contemplated, although not required. Conversely, the terms "directly coupled," "directly connected," etc., imply the absence of such additional elements.

The described embodiments are to be considered in all respects as only illustrative and not restrictive. In particular, the scope of the disclosure is indicated by the appended claims rather than by the description and figures herein. All changes that come within the meaning and range of equivalency of the claims are to be embraced within their scope.

The functions of the various elements shown in the figures, including any functional blocks labeled as "processors" and/or "controllers," may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), and non volatile storage. Other hardware, conventional and/or custom, may also be included. Similarly, any switches shown in the figures are conceptual only. Their function may be carried out through the operation of program logic, through dedicated logic, through the interaction of program control and dedicated logic, or even manually, the particular technique being selectable by the implementer as more specifically understood from the context.

What is claimed is:

1. An apparatus comprising:
a first optical detector configured to convert a first optical input signal into a first electrical signal proportional to an optical power of the first optical input signal;
a first analog-to-digital converter configured to generate a first sequence of digital electrical samples by digitally sampling the first electrical signal; and
a digital signal processor configured to:
apply a Fourier-transform operation to the first sequence of digital electrical samples to generate a first set of digital spectral components;
separate the first set of digital spectral components into a first subset and a second subset of digital spectral components;
compute a first sampling phase using the first subset of digital spectral components; and
recover data encoded in the first optical input signal using the first sampling phase.

2. The apparatus of claim 1, wherein the first optical input signal is a pulse-amplitude-modulated optical signal.

3. The apparatus of claim 2, wherein the first optical input signal is a single-sideband optical signal.

4. The apparatus of claim 1, wherein the digital signal processor is further configured to discard the second subset of digital spectral components.

5. The apparatus of claim 1, wherein the digital signal processor is further configured to:
apply a complex-conjugation operation to the second subset of digital spectral components to generate a corresponding conjugated set of digital spectral components; and
compute the first sampling phase using said corresponding conjugated set of digital spectral components.

6. The apparatus of claim 5, wherein the digital signal processor is further configured to:
multiply the digital spectral components of the first subset by the digital spectral components of the corresponding conjugated set to generate a corresponding set of products;
generate a sum of said products; and
compute the first sampling phase using a phase of said sum.

7. The apparatus of claim 1, wherein the digital signal processor is further configured to:
reorder to the first subset of digital spectral components to generate a corresponding reordered set of digital spectral components; and
compute the first sampling phase using said corresponding reordered set of digital spectral components.

8. The apparatus of claim 7, wherein the digital signal processor is further configured to:
multiply the digital spectral components of the first subset by the digital spectral components of the corresponding reordered set to generate a corresponding set of products;
generate a sum of said products; and
compute the first sampling phase using a phase of said sum.

9. The apparatus of claim 1, wherein the digital signal processor is further configured to interpolate the first sequence of digital electrical samples to generate a corresponding interpolated sequence of digital electrical samples, each having a timing corresponding to the first sampling phase.

10. The apparatus of claim 1, wherein the first analog-to-digital converter is further configured to generate the first sequence of digital electrical samples by digitally sampling the first electrical signal using the first sampling phase.

11. The apparatus of claim 10, wherein the digital signal processor is further configured to interpolate the first sequence of digital electrical samples to generate a corresponding interpolated sequence of digital electrical samples, each having a timing corresponding to the first sampling phase.

12. The apparatus of claim 1, wherein the first sequence of digital electrical samples comprises real-valued samples.

13. The apparatus of claim 1, further comprising an optical de-multiplexer configured to generate the first optical input signal and a second optical input signal by optically de-multiplexing a multiplexed optical signal.

14. The apparatus of claim 13, further comprising:
a second optical detector configured to convert the second optical input signal into a second electrical signal proportional to an optical power of the second optical input signal; and
a second analog-to-digital converter configured to generate a second sequence of digital electrical samples by digitally sampling the second electrical signal; and
wherein the digital signal processor is further configured to:
convert the first sequence of digital electrical samples and the second sequence of digital electrical samples into a corresponding sequence of complex-valued samples, each of said complex-valued samples having a respective digital electrical sample of the first sequence as a real part and a respective digital electrical sample of the first sequence as an imaginary part; and
compute the first sampling phase using said corresponding sequence of complex-valued samples.

15. The apparatus of claim 14, wherein the digital signal processor is further configured to:
apply a Fourier-transform operation to said corresponding sequence of complex-valued samples to generate a set of complex-valued spectral components of digital spectral components;
compute the first set of digital spectral components using the set of complex-valued spectral components;
compute a second set of digital spectral components using the set of complex-valued spectral components, said second set of digital spectral components corresponding to the second sequence of digital electrical samples;
separate the second set of digital spectral components into a third subset and a fourth subset of digital spectral components;
compute a second sampling phase using the third subset of digital spectral components; and recover data encoded in the second optical input signal using the second sampling phase.

16. The apparatus of claim 14, wherein each of the first sequence of digital electrical samples and the second sequence of digital electrical samples comprises real-valued samples.

17. The apparatus of claim 13, wherein the optical de-multiplexer comprises a wavelength de-multiplexer configured to de-multiplex the multiplexed optical signal based on carrier wavelength.

18. The apparatus of claim 13, wherein the optical de-multiplexer comprises a polarization de-multiplexer configured to de-multiplex the multiplexed optical signal based on polarization.

19. The apparatus of claim 13, wherein the optical de-multiplexer comprises a spatial-mode de-multiplexer configured to de-multiplex the multiplexed optical signal based on transverse waveguide modes of a multimode mode fiber carrying the multiplexed optical signal.

20. The apparatus of claim 1, wherein the digital signal processor is configured to compute the first sampling phase without relying on dispersion-compensation processing.

21. A method of manufacturing a device, the method comprising:

operatively connecting a first optical detector, a first analog-to-digital converter, and a digital signal processor; and configuring the digital signal processor to:
  apply a Fourier-transform operation to a first sequence of digital electrical samples to generate a first set of digital spectral components;
  separate the first set of digital spectral components into a first subset and a second subset of digital spectral components;
  compute a first sampling phase using the first subset of digital spectral components; and
  recover data encoded in a first optical input signal using the first sampling phase; and wherein the first optical detector is configured to convert the first optical input signal into a first electrical signal proportional to an optical power of the first optical input signal; and wherein the first analog-to-digital converter is configured to generate the first sequence of digital electrical samples by digitally sampling the first electrical signal.

* * * * *